No. 773,141.

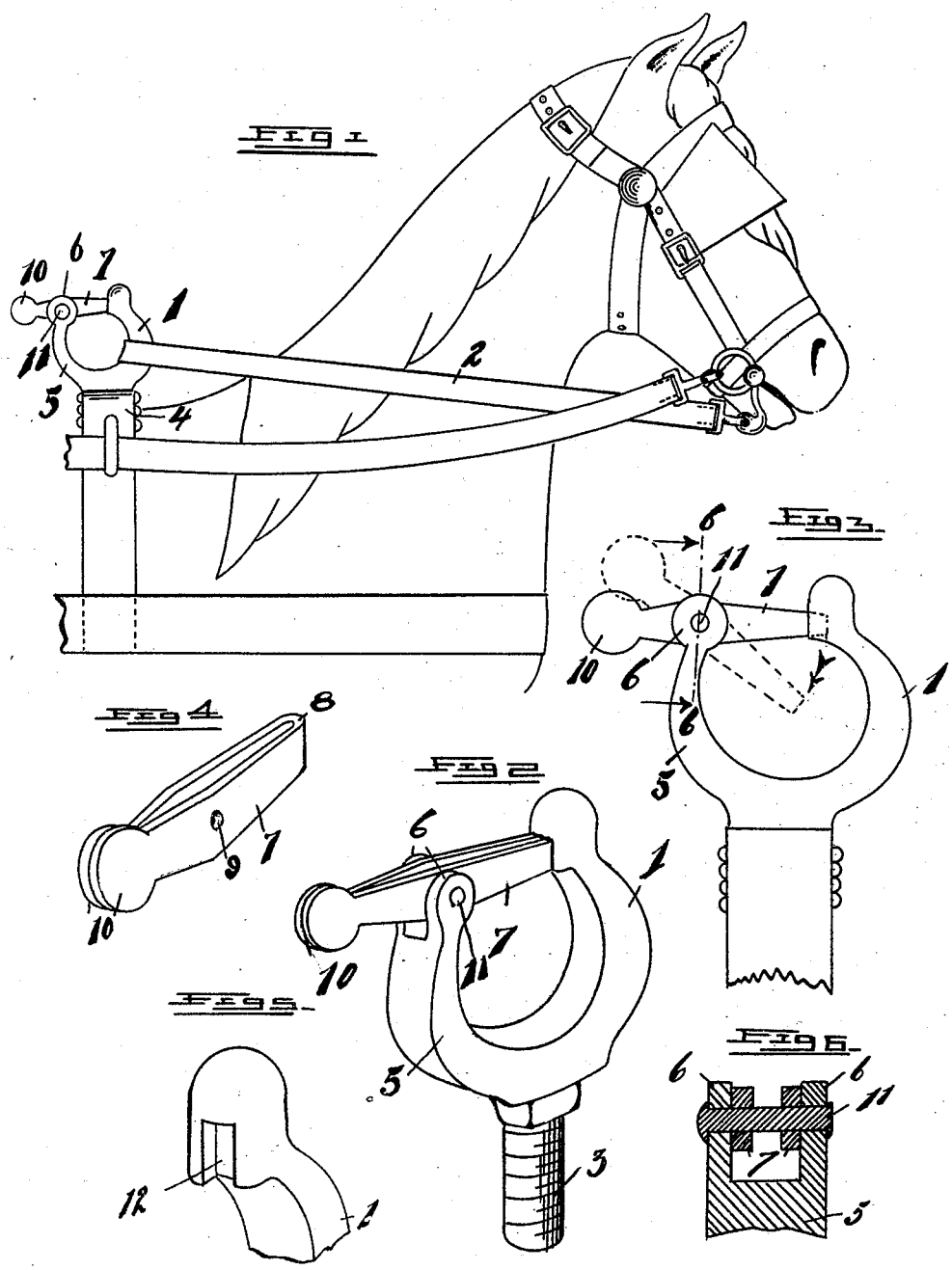

Patented October 25, 1904.

UNITED STATES PATENT OFFICE.

WILLIAM H. GONNE, OF CHATHAM, CANADA.

CHECKREIN-HOOK.

SPECIFICATION forming part of Letters Patent No. 773,141, dated October 25, 1904.

Application filed October 12, 1903. Serial No. 176,773. (No model.)

*To all whom it may concern:*

Be it known that I, WILLIAM H. GONNE, a citizen of the United States, residing at Chatham, in the county of Kent, Province of Ontario, Canada, have invented certain new and useful Improvements in Checkrein - Hooks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a checkrein-hook; and it consists in the construction and arrangement of parts hereinafter fully set forth, and pointed out particularly in the claims.

The object of the invention is to provide a hook adapted to be attached to the saddle of the harness in position to receive the checkrein and wherein the arrangement is such as to enable the closing of said hook, so as to prevent the accidental disengagement of the checkrein therefrom as incident to hooks in common use.

The object of the invention also comprehends simplicity, efficiency, and cheapness of construction.

The above object is attained by the structure illustrated in the accompanying drawings, in which—

Figure 1 is a view showing a portion of a horse and harness, illustrating the application of my invention. Fig. 2 is a perspective view of the hook closed. Fig. 3 is an enlarged elevation of the hook, showing by dotted lines the position of the parts when the hook is open. Fig. 4 is a perspective view of the pivotally-mounted spring-bar which serves to close the hook and prevent the disengagement of the rein therefrom. Fig. 5 is an enlarged perspective view of the upper end of the hook, showing the mortise-like recess which receives the end of said bar. Fig. 6 is a transverse section as on line 6 6 of Fig. 3.

Referring to the characters of reference, 1 designates the hook over which the checkrein 2 is adapted to be engaged, the base of said hook being provided with a bolt 3 for attachment to the saddle 4 on the back-strap of the harness. Projecting from the base of the hook and curving in a direction opposite thereto is a standard 5, having a bifurcated upper end, forming the opposed ears 6, between which is pivoted the cross-bar 7, adapted to extend from said standard to the end of the hook to close the opening therebetween. Said cross-bar 7 is made of an integral strip of spring metal, which is folded centrally upon itself to form the looped end 8, from which point the sides of said bar flare outwardly to the point where the transverse opening 9 passes therethrough, from whence the sides converge and terminate in the rounded end portions 10, which lie contiguous. This spring-bar 7 is placed between the ears 6 of the standard 5 and is secured by the rivet 11, which passes through said ears and through the transverse opening 9 in the sides of said bar. It is necessary to compress the sides of the spring-bar to force them between said ears. Therefore when the bar is in position it exerts a continuous outward pressure upon the ears, thereby creating sufficient friction to hold the bar in position and prevent it from accidentally being turned so as to open the hook and allow the checkrein to escape therefrom.

To more firmly retain the cross-bar in the closed position, the looped end 8 thereof passes into a keeper in the end of said hook in the form of a recess 12, into which the looped end of the bar swings when in the position shown in Figs. 1, 2, and 3, whereby it is firmly held against lateral displacement.

When desired to engage the checkrein in the hook, the inner end of the cross-bar is swung downwardly, as shown by dotted lines in Fig. 3, and said rein entered therein when said bar is returned to the position shown by solid lines, in which position it is maintained by the tension of the spring sides thereof, whereby the hook is closed in a manner to prevent the accidental disengagement of the checkrein, but allowing the rein to be easily removed when desired by swinging said bar upon its pivot to open the hook.

It will be seen that the hook and curved standard which is formed integral therewith describe the major portion of a ring and that the pivoted cross-bar carried by the standard when swung to extend across the space between the standard and hook closes said ring to form the complementary portion thereof.

Having thus fully set forth my invention, what I claim as new, and desire to secure by Letters Patent, is—

1. In a checkrein-hook, the combination of the curved hook proper, a curved standard having opposed ears, said standard forming in conjunction with said hook the major portion of a ring, a spring-bar compressed between and pivoted to the ears of said standard to swing across the opening between the standard and hook and close said ring, the tension of said bar maintaining it in the closed position.

2. In a checkrein-hook, the combination with the hook proper having a keeper therein, of a member adjacent thereto, forming in conjunction with said hook the major portion of an inclosure, adapted to receive a checkrein, opposed ears mounted upon the end of said member, a looped spring cross-bar the sides of which are compressed between and pivoted to said ears, said bar being adapted to close the opening between said member and hook, the tension of said spring-bar normally holding it in the closed position.

In testimony whereof I sign this specification in the presence of two witnesses.

WILLIAM H. GONNE.

Witnesses:
  E. S. WHEELER,
  I. G. HOWLETT.